United States Patent
Chiu et al.

(10) Patent No.: US 11,405,389 B2
(45) Date of Patent: Aug. 2, 2022

(54) INTERNET OF THINGS SYSTEM AND CONTROL METHOD THEREOF

(71) Applicant: HTC Corporation, Taoyuan (TW)

(72) Inventors: Yung-Hsiang Chiu, Taoyuan (TW);
Chi-Chen Cheng, Taoyuan (TW);
Chia-Wei Chen, Taoyuan (TW);
Wei-Chih Chang, Taoyuan (TW);
Yu-Cheng Lee, Taoyuan (TW);
Chung-Ying Yeh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 396 days.

(21) Appl. No.: 15/008,459

(22) Filed: Jan. 28, 2016

(65) Prior Publication Data
US 2016/0226870 A1  Aug. 4, 2016

Related U.S. Application Data

(60) Provisional application No. 62/109,059, filed on Jan. 29, 2015, provisional application No. 62/200,134, filed on Aug. 3, 2015.

(51) Int. Cl.
*H04L 9/32* (2006.01)
*H04L 9/40* (2022.01)
(Continued)

(52) U.S. Cl.
CPC ........ *H04L 63/0876* (2013.01); *H04L 9/3247* (2013.01); *H04L 63/0492* (2013.01);
(Continued)

(58) Field of Classification Search
CPC ... G06F 21/73; H04L 63/0876; H04L 9/3247; H04L 63/0492; H04L 2209/805;
(Continued)

(56) References Cited

U.S. PATENT DOCUMENTS 8,787,572 B1 * 7/2014 Tewari .................. H04L 9/0841
  370/401
9,338,806 B2 * 5/2016 Reshef .................. H04W 8/005
(Continued)

FOREIGN PATENT DOCUMENTS

CN     102298691 A    12/2011
CN     102595643 A     7/2012
(Continued)

OTHER PUBLICATIONS

Singelee et al, Bluetooth Security Threats and Solutions: A Survey, Jun. 1, 2012, IEEE, pp. 127-148. (Year: 2012).*
(Continued)

*Primary Examiner* — Luu T Pham
*Assistant Examiner* — Jenise E Jackson
(74) *Attorney, Agent, or Firm* — CKC & Partners Co., LLC (57) ABSTRACT

A system includes first electronic devices and a digital signature carrier. Each of the first electronic devices has a network identifier distinct from another. The digital signature carrier is configured for recording a connective information list. The connective information list includes the network identifiers of all of the first electronic devices. A second electronic device includes a digital signature reader. The second electronic device is configured to read the digital signature carrier by the digital signature reader, extract the connective information list comprising the network identifiers and pair the second electronic device with each of the first electronic devices according to the network identifiers.

19 Claims, 11 Drawing Sheets

(51) Int. Cl.

| | |
|---|---|
| *H04W 4/70* | (2018.01) |
| *H04W 4/20* | (2018.01) |
| *H04W 12/50* | (2021.01) |
| *H04W 84/18* | (2009.01) |
| *H04W 4/80* | (2018.01) |
| *H04W 12/71* | (2021.01) |
| *H04W 12/77* | (2021.01) |

(52) U.S. Cl.
CPC ............... *H04W 4/20* (2013.01); *H04W 4/70* (2018.02); *H04W 12/50* (2021.01); *H04L 2209/805* (2013.01); *H04W 4/80* (2018.02); *H04W 12/71* (2021.01); *H04W 12/77* (2021.01); *H04W 84/18* (2013.01)

(58) Field of Classification Search
CPC ..... H04W 48/20; H04W 12/50; H04W 12/55; H04W 12/71; H04W 4/80; H04W 4/70; H04W 4/20; H04W 12/77; H04W 84/18
USPC .......................................................... 713/176
See application file for complete search history.

(56) References Cited

U.S. PATENT DOCUMENTS

| | | | | |
|---|---|---|---|---|
| 2006/0078123 | A1* | 4/2006 | Bichot | H04W 48/18 380/270 |
| 2006/0101067 | A1* | 5/2006 | Kilian-Kehr | G06Q 10/08 |
| 2007/0036358 | A1* | 2/2007 | Nguyen | H04L 41/0806 380/270 |
| 2007/0120650 | A1* | 5/2007 | Nagai | G06K 7/10356 340/10.2 |
| 2007/0123166 | A1* | 5/2007 | Sheynman | H04M 1/7253 455/41.2 |
| 2009/0034591 | A1* | 2/2009 | Julian | H04W 4/21 375/220 |
| 2009/0273450 | A1* | 11/2009 | Moran | G06K 19/07336 340/10.4 |
| 2009/0286479 | A1* | 11/2009 | Thoresson | H04M 1/7253 455/41.3 |
| 2012/0184216 | A1* | 7/2012 | Hsueh | H04M 1/7253 455/41.3 |
| 2013/0334298 | A1* | 12/2013 | Sakpal | G06F 17/30879 235/375 |
| 2014/0038526 | A1* | 2/2014 | Ennis | H04W 4/21 455/41.2 |
| 2014/0211961 | A1* | 7/2014 | Koch | G08C 17/02 381/77 |
| 2014/0214564 | A1* | 7/2014 | Argue | G06Q 30/0633 705/16 |
| 2014/0220897 | A1* | 8/2014 | Wan | H04W 8/005 455/41.2 |
| 2014/0241354 | A1 | 8/2014 | Shuman et al. | |
| 2014/0301326 | A1* | 10/2014 | Patil | H04W 74/0858 370/329 |
| 2014/0369232 | A1* | 12/2014 | Kim | H04W 60/00 370/254 |
| 2015/0244810 | A1* | 8/2015 | Takatsuka | H04W 76/022 709/228 |
| 2016/0006257 | A1* | 1/2016 | Walley | H02J 7/0004 307/31 |
| 2016/0027289 | A1* | 1/2016 | Hargis | G16H 50/30 340/286.07 |
| 2016/0027399 | A1* | 1/2016 | Wilde | G06F 13/382 345/520 |
| 2016/0057790 | A1* | 2/2016 | Sim | H04W 76/023 455/41.1 |
| 2016/0066184 | A1* | 3/2016 | Bhargav-Spantzel | G06F 21/40 726/7 |
| 2016/0087838 | A1* | 3/2016 | Kim | H04L 41/12 709/224 |
| 2016/0100369 | A1* | 4/2016 | Chhabra | H04W 52/0274 370/311 |
| 2016/0157281 | A1* | 6/2016 | Syed | H04W 76/023 370/329 |
| 2016/0198402 | A1* | 7/2016 | Ko | H04W 76/02 370/329 |
| 2016/0366542 | A1* | 12/2016 | Brown | H04N 1/00347 |
| 2017/0011210 | A1* | 1/2017 | Cheong | H04W 12/06 |
| 2017/0060237 | A1* | 3/2017 | Pellaton | G06F 3/014 |

FOREIGN PATENT DOCUMENTS

| | | |
|---|---|---|
| CN | 102760263 A | 10/2012 |
| CN | 102781527 A | 11/2012 |
| TW | 201234349 A | 8/2012 |

OTHER PUBLICATIONS

Cunche et al, I Know Who You Will Meet This Evening! Linking Wireless Devices Using Wi-Fi Probe Requests, Jun. 28, 2012, IEEE, pp. 1-9. (Year: 2012).*
Corresponding Taiwanese Office Action dated Jan. 11, 2017.
Corresponding Taiwanese Office Action that these art references were cited on Oct. 27, 2016.
The office action of the corresponding Chinese application dated Oct. 15, 2018.

* cited by examiner

INTERNET OF THINGS SYSTEM AND CONTROL METHOD THEREOF

RELATED APPLICATIONS

This application claims the priority benefit of U.S. Provisional Application Ser. No. 62/109,059, filed Jan. 29, 2015, and U.S. Provisional Application Ser. No. 62/200,134, filed Aug. 3, 2015, which are herein incorporated by reference.

BACKGROUND

Field of Invention

The present application relates to a network system. More particularly, the present application relates to an Internet of Things (IoT) system and a control method thereof.

Description of Related Art

Internet of Things (IoT) is a network of objects, devices or products embedded with electronics, software, sensors and network connectivity. The objects in the IoT are able to detect, interact, communicate and/or control one another remotely across wireless connections, such that the objects in the IoT can be managed or monitored with high efficiency.

SUMMARY

An embodiment of the present disclosure is to provide a system, which includes a plurality of first electronic devices and a digital signature carrier. Each of the first electronic devices has a network identifier distinct from another. The digital signature carrier is configured for recording a connective information list. The connective information list includes the network identifiers of all of the first electronic devices. A second electronic device includes a digital signature reader. The second electronic device is configured to read the digital signature carrier by the digital signature reader, extract the connective information list comprising the network identifiers and pair the second electronic device with each of the first electronic devices according to the network identifiers.

Another embodiment of the present disclosure is to provide a method includes following operations. Network identifiers are gathered from a plurality of first electronic devices, and each of the network identifiers is distinct from another. The network identifiers of all of the first electronic devices are integrated into a connective information list recorded in a digital signature carrier. The digital signature carrier is attached to the first electronic devices.

Another embodiment of the present disclosure is to provide a method includes following operations. A digital signature carrier attached on a plurality of first electronic devices is read by a second electronic device. The digital signature carrier records a connective information list. Each of the first electronic devices has a network identifier distinct from another. The connective information list includes the network identifiers of all of the first electronic devices. The second electronic device is paired with each of the first electronic devices according to the network identifiers.

It is to be understood that both the foregoing general description and, the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
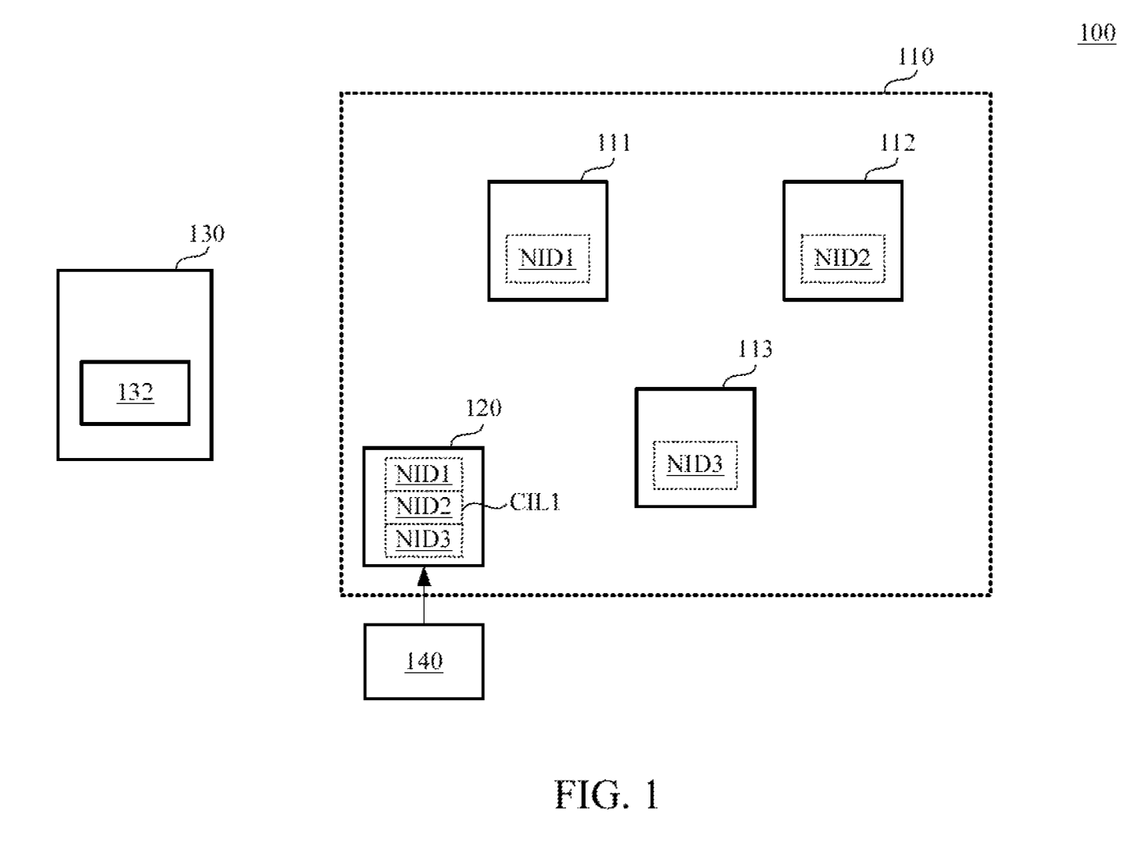
FIG. 1 is a schematic diagram illustrating a system according to embodiments of the disclosure.

Reference is made to FIG. 1, which is a schematic diagram illustrating a system 100 according to embodiments of the disclosure. As illustrated in FIG. 1, the system 100 includes a plurality of first electronic devices 111-113 and a digital signature carrier 120. As illustrated in FIG. 1, there are three first electronic devices 111, 112 and 113 for demonstration. However, the amount of the first electronic devices is not limited to three. In some embodiments, the system 100 includes N first electronic devices, and N is a positive integer larger than 1.

Each of the first electronic devices 111-113 having a network identifier NID1-NID3 distinct from another. The network identifier is a unique identifier to represent a specific device in a network. In general cases, a wireless connection to a target device is not able to be established without obtaining the network identifier of the target device. Each device has a distinct network identifier. In some embodiments, the network identifiers NID1-NID3 are Media Access Control (MAC) addresses of the first electronic devices 111-113. For example, each of the first electronic devices 111-113 includes a Bluetooth transceiver unit (not shown in figures); the network identifiers NID1 is a Bluetooth MAC address "AA:AA:AA:AA:AA:AA" of the first electronic device 111; the network identifiers NID2 is a Bluetooth MAC address "BB:BB:BB:BB:BB:BB" of the first electronic device 112; and, the network identifiers NID3 is a Bluetooth MAC address "CC:CC:CC:CC:CC:CC" of the first electronic device 113. The network identifiers NID1-NID3 are utilized by the Bluetooth transceiver units of the first electronic devices 111-113 to identify each of the electronic devices 111-113 and provide network connectivity.

The first electronic devices 111-113 are not limited to include Bluetooth transceiver units and the network identifiers are not limited to Bluetooth MAC address. In some other embodiments, each of the first electronic devices 111-113 includes a local network transceiver unit, such as WiFi-direct, ZigBee, or any equivalent local network transceiver unit, and the network identifiers will be WiFi MAC addresses, ZigBee MAC addresses, or any equivalent addresses correspondingly.

In some embodiments, the first electronic devices 111-113 are some accessory devices including a smart wristband, a smart watch, a heart rate monitor, a smart weight scale, a versatile camera, a smart glass, a wearable device and/or any equivalent devices with local network connectivity. In some embodiments, the first electronic devices 111-113 are accessory devices related to one another, such that the first electronic devices 111-113 are packed as bundle products 110 for sale.

When a user receive the bundle products 110 including the first electronic devices 111-113, the user may need to connect his own device (e.g., a second electronic device 130) to each of the first electronic devices 111-113, and set up a mesh network between the first electronic devices 111-113 and the second electronic device 130. In some embodiments, the second electronic device 130 is a mobile phone, a smart phone, a tablet computer, a laptop computer, a smart watch or any equivalent device with local network connectivity.

Multiple devices in an Internet of Things (IoT) network have to establish wireless connections to one another. Based on current Bluetooth protocol, a user has to manipulate a device for searching another device, and pair these two devices after the search. In a practice to form a mesh network between 4 devices, the user has to repeat the pairing procedures for 6 times. In the practice to form a mesh network between 5 devices, the user has to repeat the pairing procedures for 10 times. It takes a lot time to set up a mesh network between multiple devices because the pairing procedures must be repeated many times in the practice.

In some embodiments, the digital signature carrier 120 is configured for recording a connective information list CIL1. The connective information list CIL1 includes the network identifiers NID1-NID3 of all of the first electronic devices 111-113. The digital signature carrier 120 is attached to the first electronic devices 111-113. In some embodiments, the digital signature carrier 120 is attached onto a package of the bundle products 110, a case of one of the first electronic devices 111-113, or a user manual of the bundle products 110, etc. The following Table 1 demonstrates an example of the connective information list CIL1.

TABLE 1

| DEVICES | NETWORK IDENTIFIER | CONNECTIVE MAPPING |
|---------|--------------------|--------------------|
| 111 | AA:AA:AA:AA:AA:AA | 112, 113 |
| 112 | BB:BB:BB:BB:BB:BB | 111, 113 |
| 113 | CC:CC:CC:CC:CC:CC | 111, 112 |

The second electronic device 130 includes a digital signature reader 132. The second electronic device 130 is configured to read the digital signature carrier 120 by the digital signature reader 132, extract the connective information list CIL1 comprising the network identifiers NID1-NID3 and pair the second electronic device 130 with each of the first electronic devices 111-113 according to the network identifiers NID1-NID3.

When the user receives the bundle products 110 including the first electronic devices 111-113, the user activates the digital signature reader 132 on the second electronic device 130 to read the digital signature carrier 120 attached to the bundle products 110. The second electronic device 130 extracts the connective information list CIL1 and obtains the network identifiers NID1-NID3 from the connective information list CIL1. Therefore, the second electronic device 130 will be able to be paired with each one of the first electronic devices 111-113.

For example, each of the second electronic device 130 and the first electronic devices 111-113 includes a Bluetooth transceiver unit (not shown in figures), and the Bluetooth transceiver unit of the second electronic device 130 is paired to all of the Bluetooth transceiver units of the first electronic device 111-113 automatically after the digital signature carrier 120 is read. Therefore, the user is not required to activate the pairing procedure three times to acquire the network identifiers NID1-NID3 and pair the first electronic devices 111-113 one by one.

Figure 2:
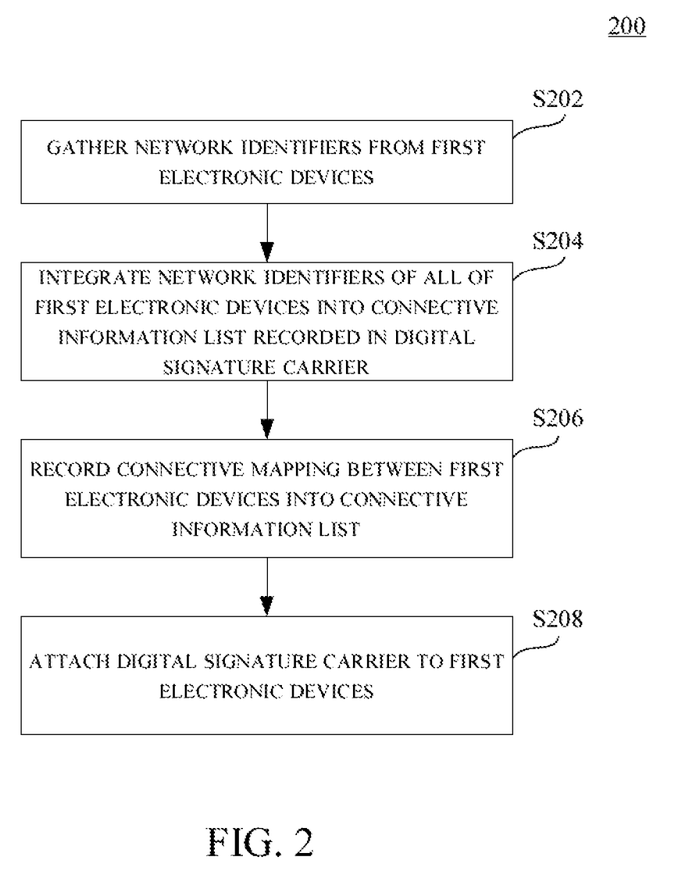
FIG. 2 is a flow chart illustrating a method according to embodiments of the disclosure.

Reference is made to FIG. 2. FIG. 2 is a flow chart illustrating a method 200 according to embodiments of the disclosure. The method 200 is suitable to be utilized on the system 100 illustrated in FIG. 1. In some embodiments, the method 200 is related to produce the connective information list CIL1 recorded in the digital signature carrier 120.

As shown in FIG. 1, the system 100 in some embodiments further includes a digital signature producer 140. As shown in FIG. 2, operation S202 is performed to gather the network identifier NID1-NID3 from each of the first electronic devices 111-113 by the digital signature producer 140. Operation S204 is performed to integrate the network identifiers NID1-NID3 of all of the first electronic devices 111-113 into the connective information list CIL1 (as demonstrated in Table 1) by digital signature producer 140. In some embodiments, the digital signature producer 140 writes the connective information list CIL1 into the digital signature carrier 120 before the first electronic devices 111-113 are packed as the bundle products 110 for sale.

In some embodiments, operation S206 is performed to record a connective mapping between the first electronic devices 111-113. The connective mapping defines connective relationships among the bundle products 110, which are first electronic devices 111-113. As the connective mapping demonstrated in Table 1, the first electronic device 111 is to be paired with both of the first electronic device 112 and the first electronic device 113; the first electronic device 112 is to be paired with both of the first electronic device 111 and the first electronic device 113; and, the first electronic device 113 is to be paired with both of the first electronic device 111 and the first electronic device 112. In other words, the connective mapping in the connective information list CIL1 defines links of the mesh network between the bundle products 110.

In some embodiments, the digital signature carrier 120 is a barcode label or a Quick Response (QR) code label. The digital signature producer 140 is configured to print the barcode label or the QR code label. Operation S208 is performed to attach the digital signature carrier 120 to the first electronic devices 111-113. In some practices, the barcode label or the QR code label is adhered to a surface of the package of the bundle products 110 or one of the first electronic devices 111-113. In some other practices, the barcode label or the QR code label is adhered to or printed in a user manual of the bundle products 110. The digital signature reader 132 of the second electronic device 130 includes an image-capturing unit, e.g., a barcode reader, a QR code reader, or a camera unit. The image-capturing unit is configured to scan the barcode label, or the Quick Response (QR) code label.

In some other embodiments, the digital signature carrier 120 is a Near Field Communication (NFC) tag or a Radio Frequency Identification (RFID) tag. The digital signature producer 140 is configured to write the connective information list CIL1 into the NFC tag or the RFID tag. Operation S208 is performed to attach the digital signature carrier 120 to the first electronic devices 111-113. In some practices, the NFC tag or the REID tag is adhered to the package of the bundle products 110. In some practices, the NFC tag or the RFID tag is embedded in at least one of the bundle products 110. The digital signature reader 132 of the second electronic device 130 includes a NFC receiver or a RFID receiver. The NFC reader or the RFID reader is configured to read the NFC tag or the RFID tag wirelessly.

Figure 3:
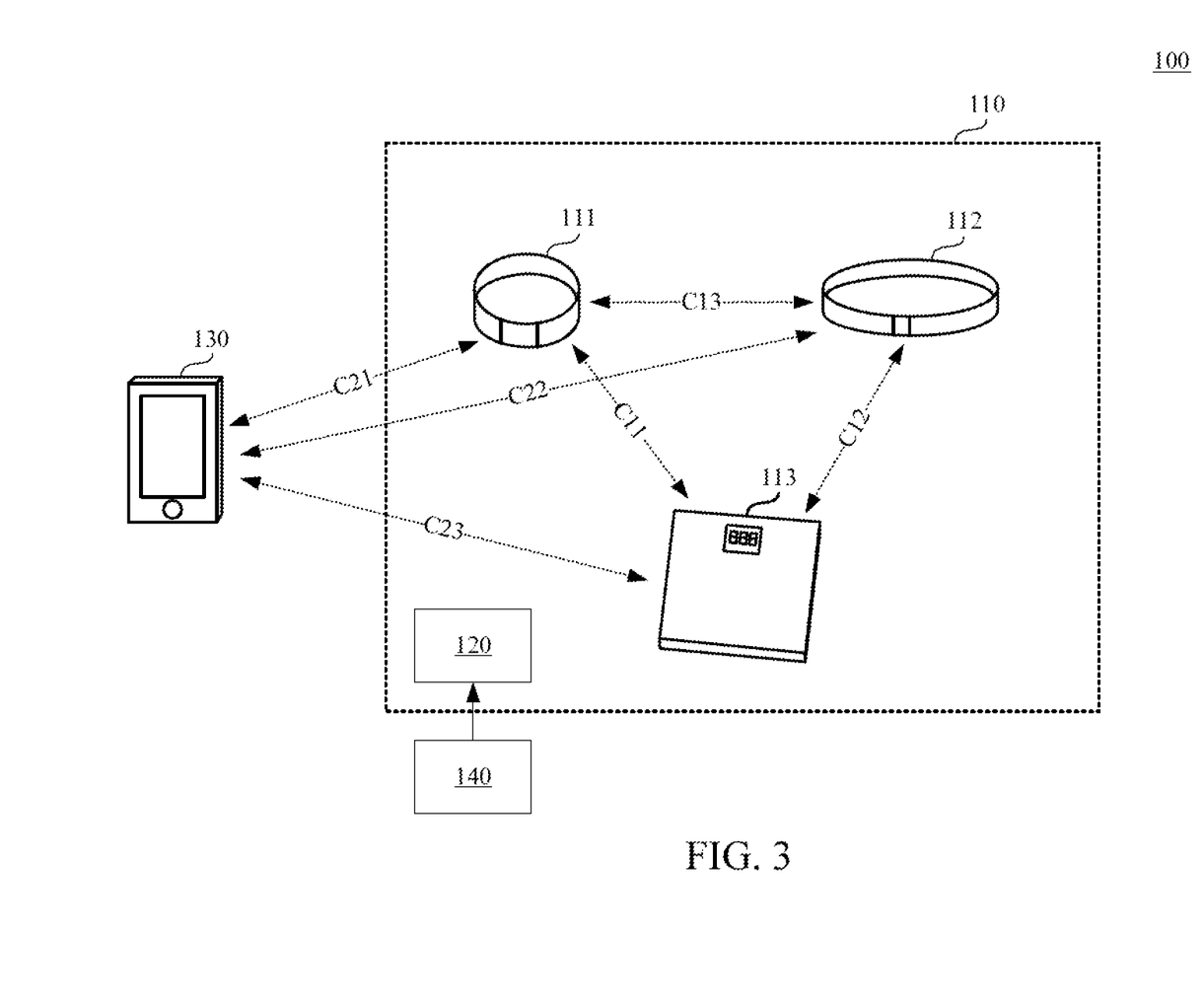
FIG. 3 is a schematic diagram illustrating a demonstrational case of the system in FIG. 1.
Figure 4:
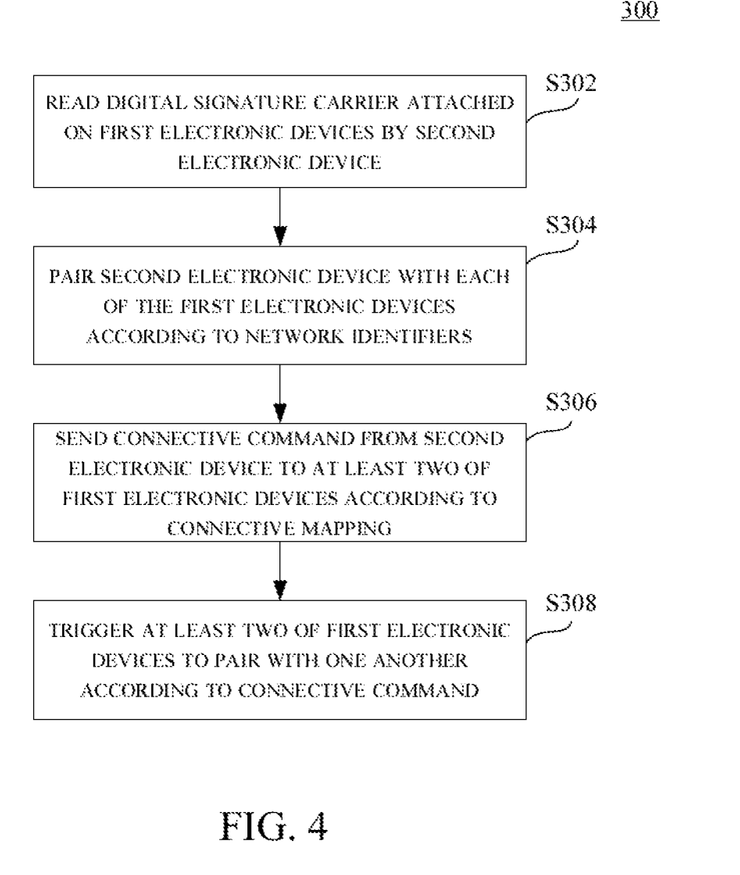
FIG. 4 is a flow chart illustrating a method according to embodiments of the disclosure.

Reference is also made to FIG. 3 and FIG. 4. FIG. 3 is a schematic diagram illustrating a demonstrational case of the system 100 in FIG. 1. FIG. 4 is a flow chart illustrating a method 300 according to embodiments of the disclosure. The method 300 is suitable to be utilized on the system 100 illustrated in FIG. 1 and FIG. 3. According to some embodiments of the disclosure as illustrated in FIG. 3, the first electronic device 111 is a smart wristband, the first electronic device 112 is a heart rate monitor and the first electronic device 113 is a smart weight scale. The first electronic devices 111-113 are accessory devices wireless connected to the second electronic device 130, which is a smart phone owned by the user as illustrated in FIG. 3 in some embodiments.

When the user receives the bundle products 110 including the first electronic devices 111-113, operation S302 is performed to read the digital signature carrier 120 attached on the first electronic devices 111-113 by the second, electronic device 130. The digital signature reader 132 extracts the connective information list CIL1 including the network identifiers NID1-NID3 corresponding to the first electronic devices 111-113. Based on the obtained network identifiers NID1-NID3, operation S304 is performed to pair the second electronic device 130 with each of the first electronic devices 111-113. After, the electronic device 130 is paired with the first electronic devices 111-113, wireless connections C21, C22 and C23 are established between the electronic device 130 and each of the first electronic devices 111-113.

In some embodiments, the connective information list CIL1 further records the connective mapping (as shown in Table 1). The connective mapping indicates the connective relationships between the first electronic devices 111-113. In some embodiments to complete the mesh network of the IoT network, the first electronic devices 111-113 are required to connect to one another and share information. For example, the heart rate monitor will send a heart rate history of the user to the smart wristband, such that the smart wristband, can determine whether the user is actually running. For another example, the smart wristband will send a step count of the user to the weight scale, such that the weight scale can analyze the relationship between weight and exercise history of the user.

Operation S306 is performed to send a connective command from the second electronic device 130 to at least two of the first electronic devices 111-113 according to the connective mapping. Operation S308 is performed to trigger the at least two of the first electronic devices 111-113 to be paired with one another according to the connective command.

According to the connective mapping demonstrated in Table 1 the first electronic devices 111 and 112 are triggered to be paired with each other, such that the wireless connection C13 is established. The first electronic devices 111 and 113 are triggered to be paired with each other, such that the wireless connection C11 is established. The first electronic devices 112 and 113 are triggered to be paired with each other, such that the wireless connection C12 is established.

In some embodiments, the connective command from the second electronic device 130 to the first electronic device 111 includes the network identifiers NID2 and NID3, such that the first electronic device 111 will obtain the necessary information to pair with the first electronic devices 112 and 113. The connective commands to the first electronic device 112 and to the first electronic device 113 can be reckoned accordingly.

However, the connective mapping between the first electronic devices 111-113 is not limited to link every path between any two of the first electronic devices 111-113. The connective mapping is defined according a requirement of the practical applications. It is assumed that the first electronic devices 111 and 112 do not share information between each other, and the connective mapping recorded into the connective information list CIL1 is demonstrated as the following Table 2:

TABLE 2

| DEVICES | NETWORK IDENTIFIER | CONNECTIVE MAPPING |
| --- | --- | --- |
| 111 | AA:AA:AA:AA:AA:AA | 113 |
| 112 | BB:BB:BB:BB:BB:BB | 113 |
| 113 | CC:CC:CC:CC:CC:CC | 111, 112 |

Figure 5:
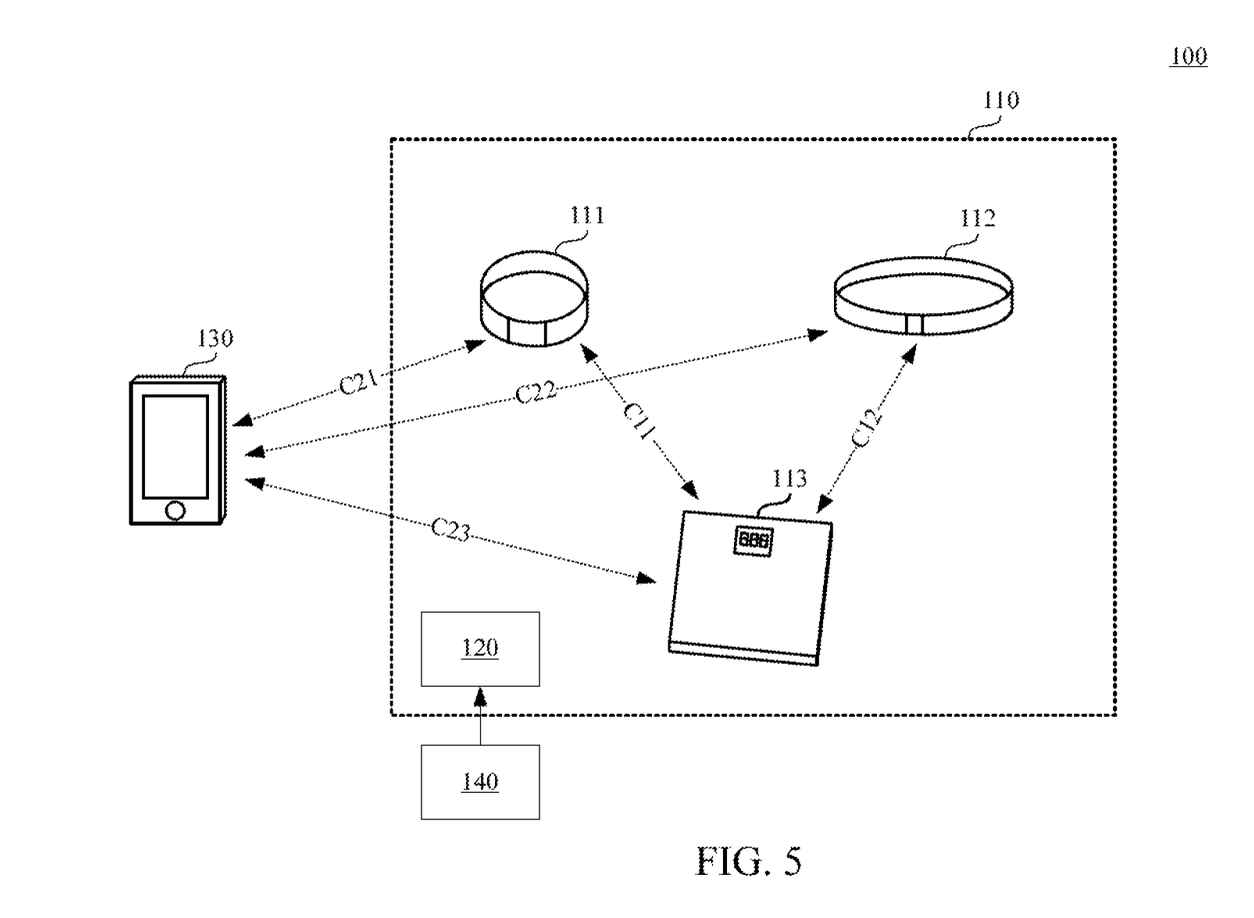
FIG. 5 is a schematic diagram illustrating another demonstrational case of the system in FIG. 1.

Reference is also made to FIG. 5, which is a schematic diagram illustrating another demonstrational case of the system 100 in FIG. 1. As the demonstrational case shown in FIG. 5, the connective command is generated according to the connective mapping of the connective information list CIL1 shown in Table 2, such that the wireless connections C11 and C12 are established, and there is no direct wireless connection established by the first electronic devices 111 and 112.

In some embodiments, the connective command from the second electronic device 130 to the first electronic device 111 includes the network identifier NID3, such that the first electronic device 111 will obtain the necessary information to pair with the first electronic device 113. The connective commands to the first electronic device 112 and to the first electronic device 113 can be reckoned accordingly.

Based on aforesaid embodiments, after the user receives the bundle products 110, the user can manipulate the second electronic device 130 to read the digital signature carrier 120 (e.g., the barcode label, the QR code label, the NFC tag or the RFID tag) attached on the bundle products 110, such that the second electronic device 130 will be paired with each one of the first electronic devices 111, 112 and 113 in the bundle products 110 automatically without reading the network identifiers NID1-NID3 and, pairing the devices one by one. Furthermore, the first electronic devices 111-113 are selectively triggered by the connective command to be paired with one another according to the connective mapping of the connective information list CIL1. If a link between two of the first electronic devices 111-113 is not necessary according to practical applications, the connective mapping is set accordingly to eliminate the direct connection.

Figure 6:
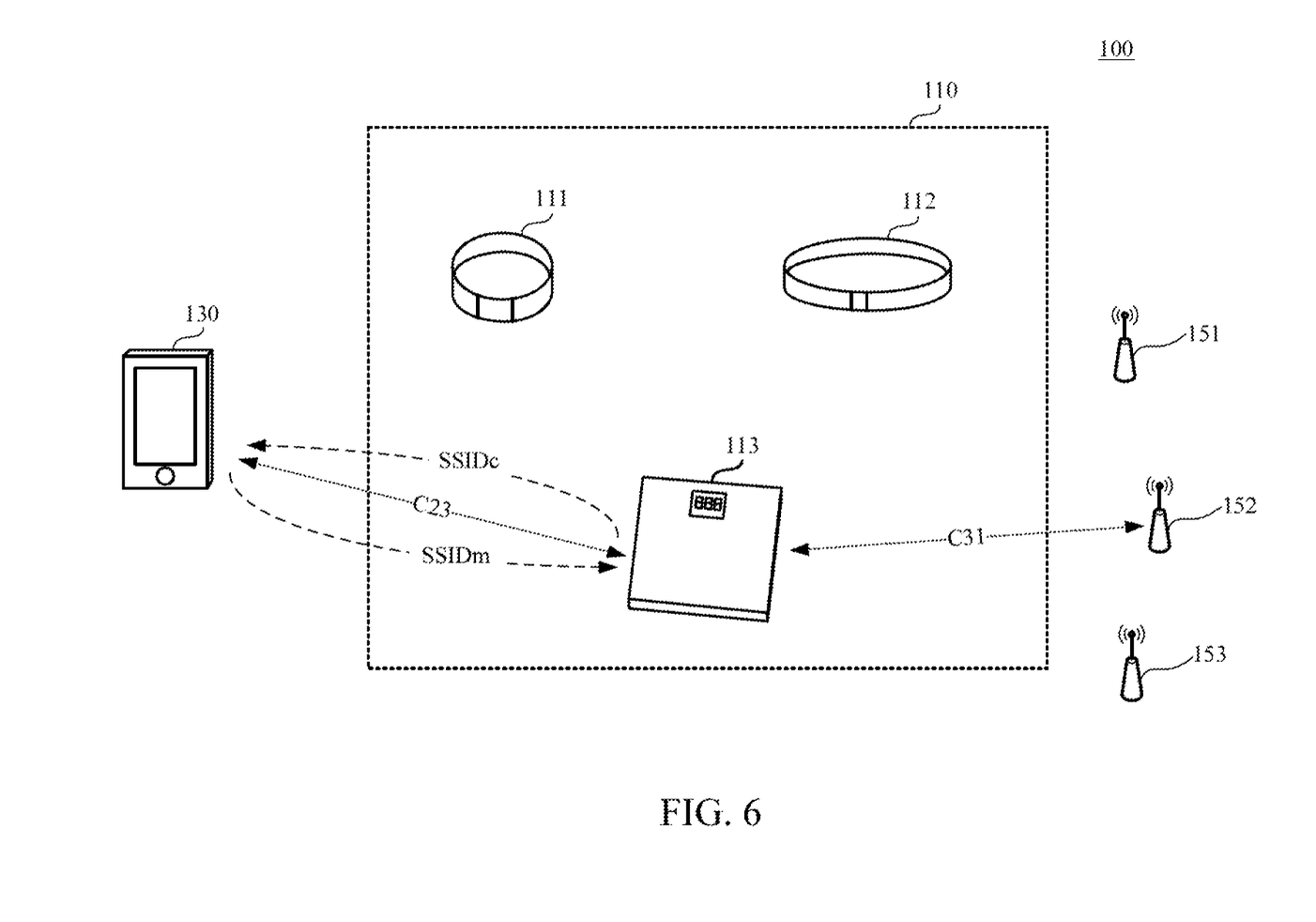
FIG. 6 is a schematic diagram illustrating another demonstrational case of the system in FIG. 1.
Figure 7:
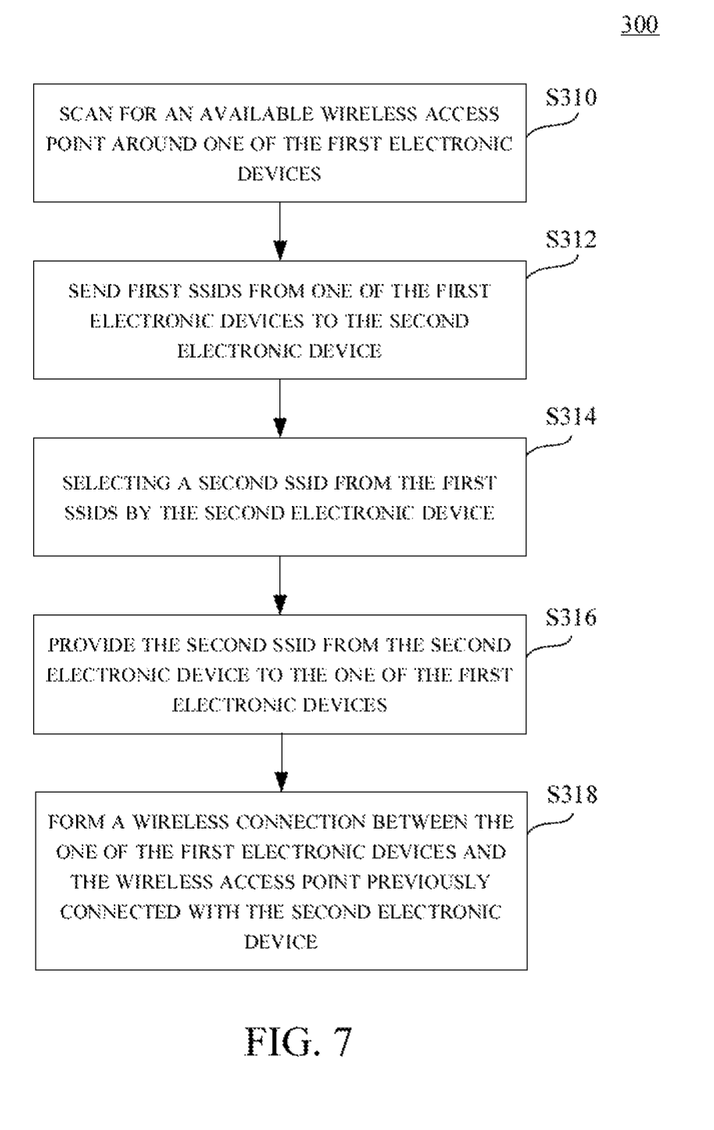
FIG. 7 is a flow chart illustrating further steps of the method in FIG. 4.

Reference is further made to FIG. 6 and FIG. 7. FIG. 6 is a schematic diagram illustrating another demonstrational case of the system 100 in FIG. 1. FIG. 7 is a flow chart illustrating further steps of the method 300 in FIG. 4.

Based on aforesaid embodiments in FIG. 3 and FIG. 4, the wireless connections C11-C13 are established among the first electronic device 111-113 and the wireless connections C21-C23 are established between the second electronic device 130 and each of the first electronic devices 111-113. For brevity of illustration, the wireless connection C23 is shown in FIG. 6.

In some embodiments, the second electronic device 130 has a Bluetooth transceiver unit to connect with the first electronic devices 111-113, and the second electronic device 130 has a WiFi transceiver unit to connect to a wireless access point. In some practices, the second electronic device 130 will maintain a record or a log file about previously connected wireless access points. Once the second electronic device 130 connects to a new wireless access point, the second electronic device 130 will keep the wireless access point in record.

The first electronic devices 111-113 are connected to the second electronic device 130 over the Bluetooth connections. In addition, the first electronic devices 111-113 in some embodiments also have network connectivity over WiFi. As the demonstrational case illustrated in FIG. 6, the electronic device 113 includes a WiFi transceiver unit to connect to a WiFi access point.

As shown in FIG. 6 and FIG. 7, when the first electronic device 113 tries to establish a direct wireless connection to a WiFi access point, operation S310 is performed by the first electronic device 113 to search for an available wireless access point around the first electronic device 113. In the demonstrational case, the searching outcome by the first electronic device 113 includes three Service Set Identifiers (SSID) collected from three WiFi access points 151, 152 and 153 around the first electronic device 113.

If the first electronic device 113 has no information about the WiFi access points 151, 152 and 153, the first electronic device 113 has to try to access the WiFi access points 151-153 one by one, to determine whether the WiFi access points 151-153 are accessible in a practice.

As shown in FIG. 6 and FIG. 7, operation S312 is performed to send a package SSIDc of three service set identifiers of the WiFi access points 151-153 from the first electronic device 113 to the second electronic device 130 over the wireless connection C23.

In the demonstrational case, it is assumed that the second electronic device 130 has previously connected to the wireless access point 152. Operation S314 is performed to select a service set identifier from the service set identifiers of the WiFi access points 151-153. In the demonstrational case, it is assumed that the second electronic device 130 has previously connected to the wireless access point 152. Therefore, the service set identifier corresponding to the wireless access point 152 previously connected with the second electronic device 130 will be selected.

Operation S316 is performed to provide a package SSIDm of the service set identifier selected in operation S314 from the second electronic device 130 to the first electronic device 113 over the wireless connection C23.

Because the second electronic device 130 has been previously connected to the wireless access point 152, the second electronic device 130 has a record about a password or an authentication key to the wireless access point 152. In some embodiments, the password or the authentication key are also provided in the package SSIDm along with the service set identifier corresponding to the wireless access point 152 from the second electronic device 130 to the first electronic device 113.

Operation S318 is performed to form a wireless connection between the first electronic device 113 and the wireless access point 152 previously connected with the second electronic device 130 according to the service set identifier provided in the package SSIDm. In addition, the first electronic device 113 will acquire the password or the authentication key to access the wireless access point 152 from the package SSIDm in some embodiments.

Based on aforesaid embodiments, after the user receives the bundle products 110, the user can manipulate the second electronic device 130 is read the digital signature carrier 120 (e.g., the barcode label, the QR code label, the NFC tag or the RFID tag) attached on the bundle products 110, such that the mesh network among the second, electronic device 130 and the first electronic devices 111-113 in the bundle products 110 is established automatically. Furthermore, one of the first electronic devices 111-113 can easily access to a wireless access point if the wireless access point has been previously connected with the second electronic device 130.

Figure 8:
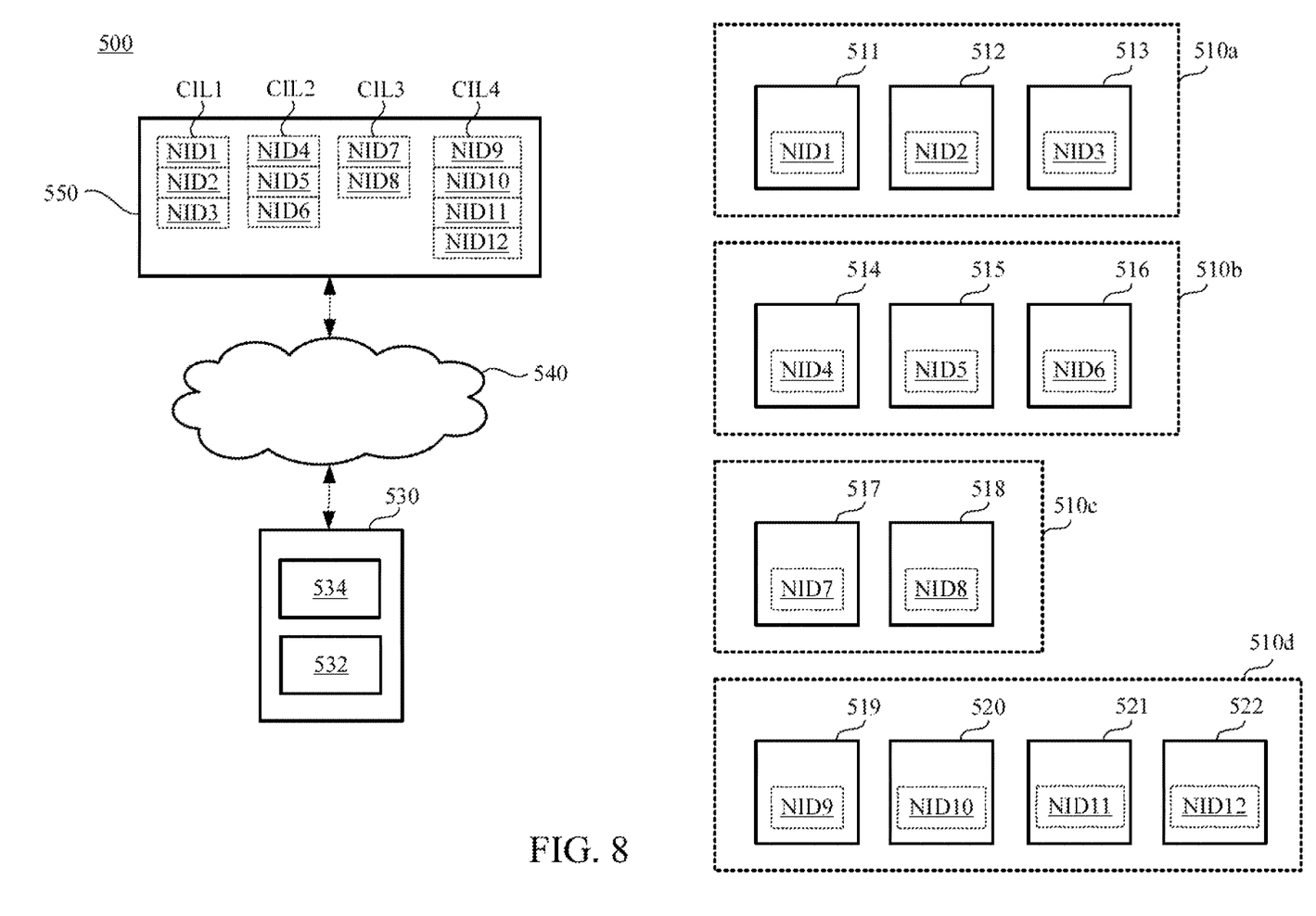
FIG. 8 is a schematic diagram illustrating a system according to some embodiments of the disclosure.

Reference is made to FIG. 8, which is a schematic diagram illustrating a system 500 according to some embodiments of the disclosure. As illustrated in FIG. 8, the system 500 includes first electronic devices 511-522, a second electronic device 530 and a remote server database 550. The second electronic device 530 is telecommunicated with the remote server database 550 through a network 540.

Each of the first electronic devices 511-522 having a network identifier NID1-NID12 distinct from another. The network identifier is a unique identifier to represent a specific device in a network. In some embodiments, the network identifiers NID1-NID12 are Media Access Control (MAC) addresses of the first electronic devices 511-522.

For example, each of the first electronic devices 511-522 includes a Bluetooth transceiver unit (not shown in figures); the network identifiers NID1 is a Bluetooth MAC address "AA:AA:AA:AA:AA:AA" of the first electronic device 511; the network identifiers NID2 is a Bluetooth MAC address "BB:BB:BB:BB:BB:BB" of the first electronic device 512; the network identifiers NID3 is a Bluetooth MAC address "CC:CC:CC:CC:CC:CC" of the first electronic device 513; the network identifiers NID4 is a Bluetooth MAC address "DD:DD:DD:DD:DD:DD" of the first electronic device 514; the network identifiers NID5 is a Bluetooth MAC address "EE:EE:EE:EE:EE:EE" of the first electronic device 515; the network identifiers NID6 is a Bluetooth MAC address "FF:FF:FF:FF:FF:FF" of the first electronic device 516. Other first electronic devices 517-522 also have unique network identifiers for distinguishing each others.

The first electronic devices 511-522 are not limited to include Bluetooth transceiver units and the network identifiers are not limited to Bluetooth MAC address. In some other embodiments, each of the first electronic devices 511-522 includes a local network transceiver unit, such as WiFi-direct, ZigBee, or any equivalent local network transceiver unit, and the network identifiers will be WiFi MAC addresses, ZigBee MAC addresses, or any equivalent addresses correspondingly.

In some embodiments, the first electronic devices 511-522 are some accessory devices including a smart wristband, a smart watch, a heart rate monitor, a smart weight scale, a versatile camera, a smart glass, a wearable device and/or any equivalent devices with local network connectivity. In some embodiments, the first electronic devices 511-522 are accessory devices related to one another. In some embodiments, the first electronic devices 511-513 are packed as a set of bundle products 510a for sale. The first electronic devices 514-516 are packed as another set of bundle products 510b for sale. The first electronic devices 517-518 are packed as still another set of bundle products 510c for sale. The first electronic devices 519-522 are packed as still another set of bundle products 510d for sale.

In some embodiments, the bundle products 510a, 510b, 510c and 510d includes related devices for different purpose or different commercial strategies. For example, the bundle products 510a include a smart wristband, a heart rate monitor and a smart weight scale. The bundle products 510b include another smart wristband, another heart rate monitor and another smart weight scale. The bundle products 510c include a versatile camera and a smart glass. The bundle products 510d include another heart rate monitor, another smart weight scale, another versatile camera and another smart glass.

Figure 9:
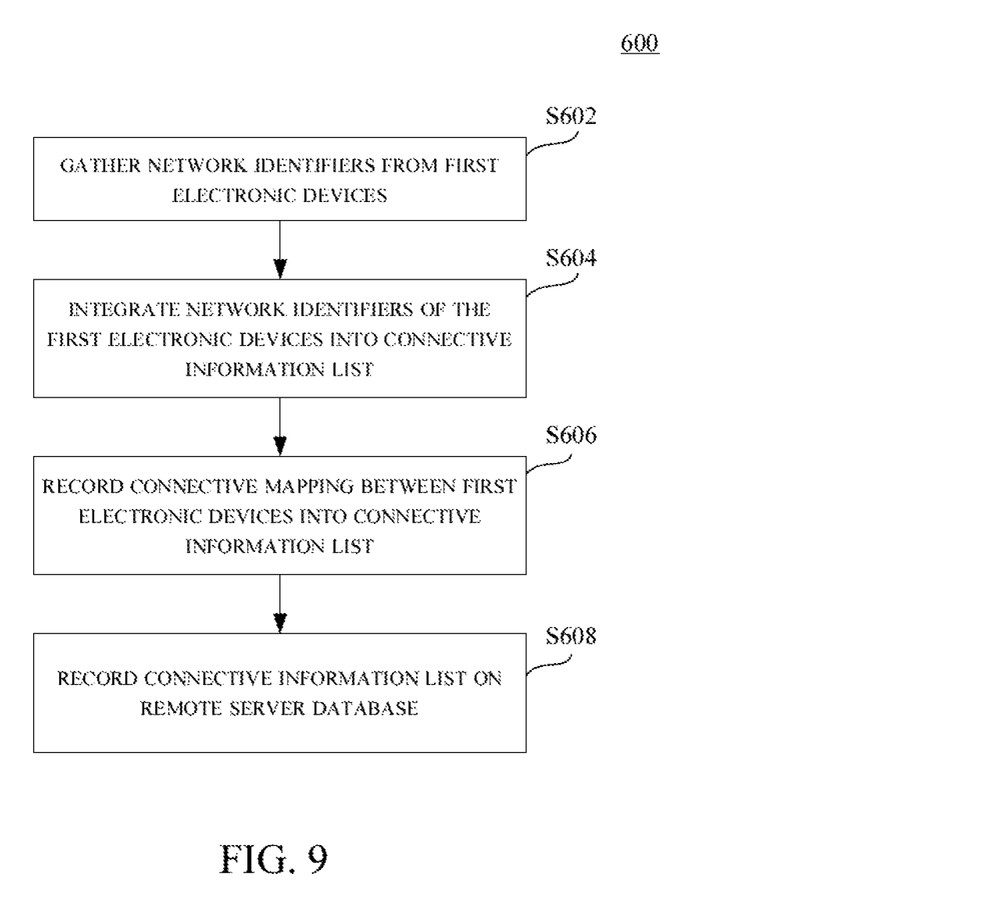
FIG. 9 is a flow chart illustrating a method according to embodiments of the disclosure.

FIG. 9 is a flow chart illustrating a method 600 according to embodiments of the disclosure. The method 600 is suitable to be utilized on the system 500 illustrated in FIG. 8. In some embodiments, the method 600 is related to produce the connective information lists CIL1, CIL2, CIL3 and CIL4 shown in FIG. 8. As shown in FIG. 9, operation S602 is performed to gather the network identifier NID1-NID3 from the first electronic devices 511-513 of the bundled products 510a, gather the network identifier NID4-NID6 from the first electronic devices 514-516 of the bundled products 510b, gather the network identifier NID7-NID8 from the first electronic devices 517-518 of the bundled products 510c, and gather the network identifier NID9-NID12 from the first electronic devices 519-522 of the bundled products 510d. Operation S604 is performed to integrate the network identifiers NID1-NID3, NID4-NID6, NID7-NID8 and NID9-NID12 into the connective information lists CIL1, CIL2, CIL3 and CIL4 respectively as shown in FIG. 8. The first electronic devices, 511-513/514-516/517-518/519-522, belonging to the same bundled products, 510a/510b/510c/510d, are collected in the same connective information list CIL1/CIL2/CIL3/CIL4.

The following Table 3 demonstrates an example of the connective information list CIL2.

TABLE 3

| DEVICES | NETWORK IDENTIFIER | CONNECTIVE MAPPING |
| --- | --- | --- |
| 514 | DD:DD:DD:DD:DD:DD | 515, 516 |
| 515 | EE:EE:EE:EE:EE:EE | 514, 516 |
| 516 | FF:FF:FF:FF:FF:FF | 514, 515 |

In some embodiments, operation S606 in FIG. 9 is performed to record a connective mapping between the first electronic devices 511-522 of the bundle products 510a-510d into the connective information lists CIL1-CIL4. The connective mapping defines connective relationships among the bundle products 510a-510d. As the connective mapping demonstrated in Table 3, the first electronic devices 514-516 are configured to be paired with each others. In other words, the connective mapping in the connective information list CIL2 defines links of the mesh network between the bundle products 510b. Similarly, the connective information lists CIL1, CIL3 or CIL4 records connective mappings between the bundled products 510a, 510c or 510d.

Operation S608 in FIG. 9 is performed to record connective information lists CIL1-CIL4 in the remote server database 550 in FIG. 8. In some embodiments, the remote server database 550 is a server established by manufacturer of the bundle product, and the remote server database 550 can be accessed by the second electronic device 530 through the network 540. As shown in FIG. 8, the second electronic device 530 includes, for example, a telecommunication unit 534 and a local communication unit 532. The telecommunication unit 534, e.g., 3G mobile transceiver, 4G mobile transceiver and/or WiFi transceiver, is utilized to connect to the network 540. The local communication unit 532, e.g., Bluetooth transceiver, ZigBee transceiver and/or WiFi Direct transceiver, is utilized to connect to the first electronic devices 511-522.

Figure 10:
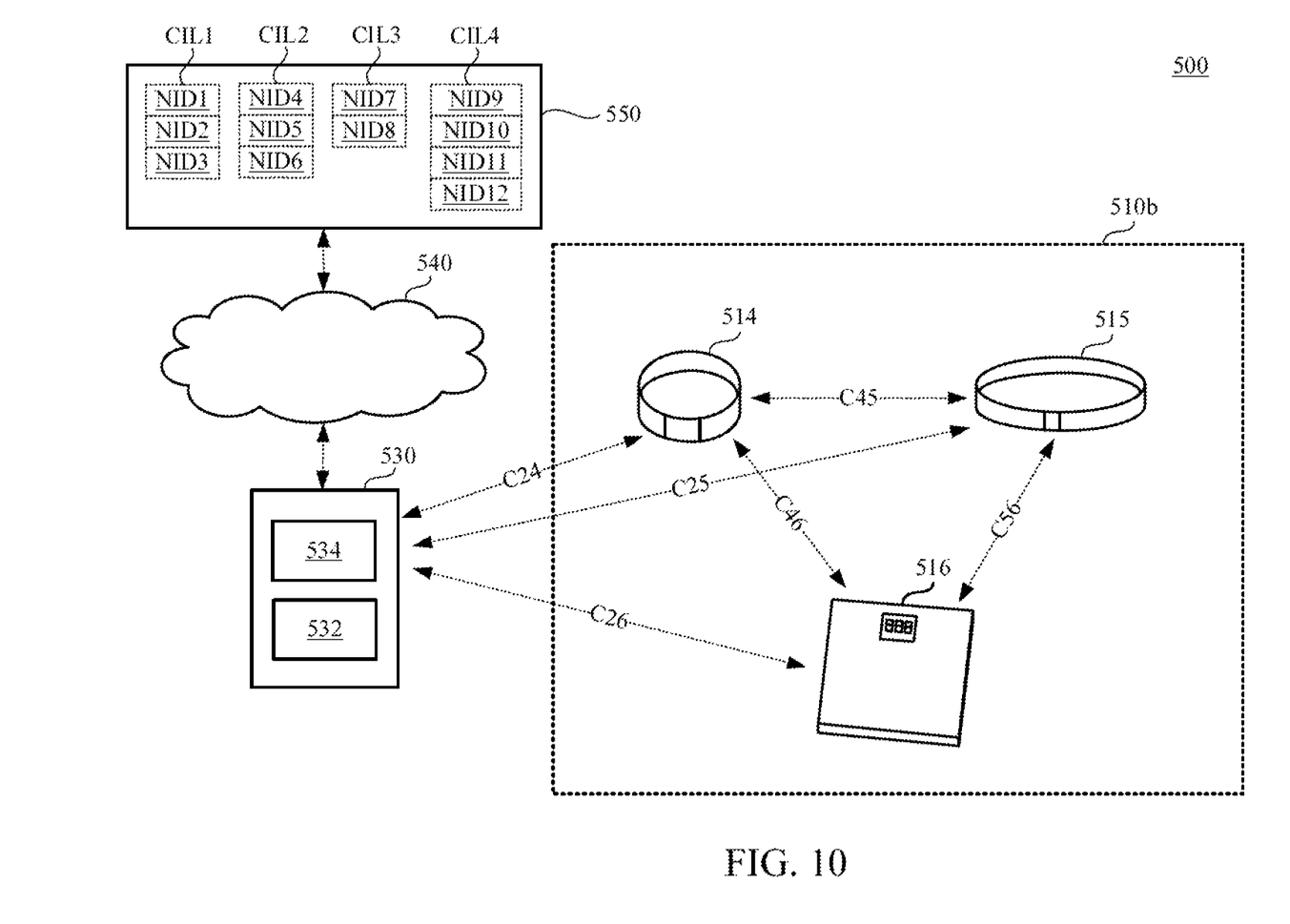
FIG. 10 is a schematic diagram illustrating a demonstrational case of the system in FIG. 8.
Figure 11:
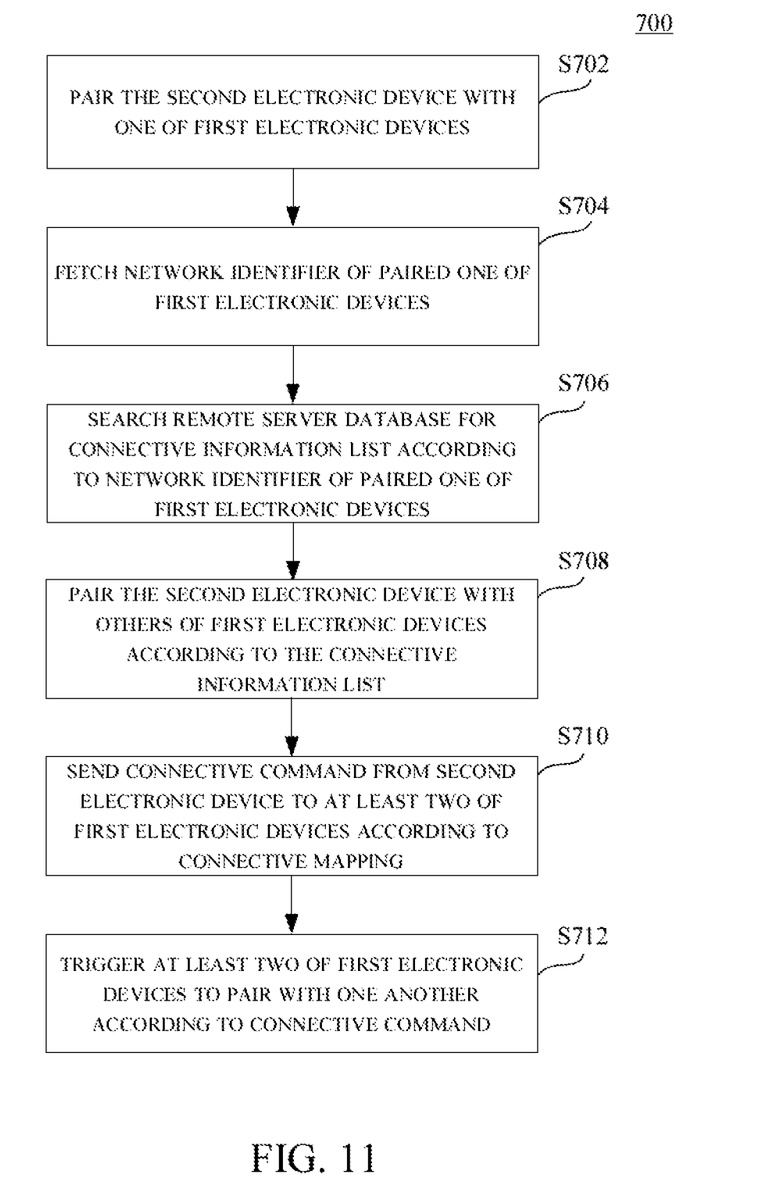
FIG. 11 is a flow chart illustrating a method according to embodiments of the disclosure.

Reference is further made to FIG. 10 and FIG. 11. FIG. 10 is a schematic diagram illustrating a demonstrational case of the system 500 in FIG. 8. FIG. 11 is a flow chart illustrating a method 700 according to embodiments of the disclosure. The method 700 is suitable to be utilized on the system 500 illustrated in FIG. 8 and FIG. 10. According to some embodiments of the disclosure as illustrated in FIG. 10, the bundled products 510b include the first electronic devices 514-516. The first electronic device 514 is a smart wristband, the first electronic device 515 is a heart rate monitor and the first electronic device 516 is a smart weight scale. The first electronic devices 514-516 are accessory devices wireless connected, to the second electronic device 530, which is a smart phone owned by the user as illustrated in FIG. 10 in some embodiments.

When the user receives the bundle products 510b including the first electronic devices 514-516, operation S702 is performed to pair the second electronic device 530 with one of the first electronic devices 514-516 of the bundle products 510b. For example, the user can manipulate the user interface on the second electronic device 530 and configure the second electronic device 530 to be paired with the first electronic device 515. In some embodiments, this pairing process can be authorized by typing password/code or pressing specific buttons on two devices. When the second electronic device 530 and the first electronic device 515 are paired, operation S704 is performed by the local communication unit 532 of the second electronic device 530 to fetch the network identifier NID5 of the first electronic device 515. In some embodiments, a wireless connection C25 is established between the second electronic device 530 and the first electronic device 515.

Based on the network identifier NID5, operation S706 is performed to search the remote server database 550 for corresponding connective information list according to the network identifier NID5 of the first electronic device 515. In this case, the connective information list CIL2 contains the same network identifier NID5. In response to the searching, the connective information list CIL2 is transmitted from the remote server database 550 to the second electronic device 530. After the second electronic device 530 acquires the connective information list CIL2, operation S708 is performed to pair the second electronic device 530 with others of first electronic devices 514 and 516 according to the connective information list CIL2. Wireless connections C24 and C26 are established between the second electronic device 530 and the first electronic devices 514 and 516.

Operation S710 is performed to send a connective command from the second electronic device 530 to at least two of the first electronic devices 514-516 according to the connective mapping. Operation S712 is performed to trigger the at least two of the first electronic devices 514-516 to be paired with one another according to the connective command.

According to the connective mapping demonstrated in Table 3, the first electronic devices 514 and 515 are triggered to be paired with each other, such that the wireless connection C45 is established. The first electronic devices 514 and 516 are triggered to be paired with each other, such that the wireless connection C46 is established. The first electronic devices 515 and 516 are triggered to be paired with each other, such that the wireless connection C56 is established.

Based on aforesaid embodiments, when user buy one set of bundled products 510*b* and pair the second electronic device 530 with one device in the bundled products 510*b*, and the second electronic device 530 is able to obtain the connective information list CIL2 from the remote server database 550. Based on the connective information list CIL2, the wireless connections C24-C26 between the second electronic device 530 and the electronic devices 514-516 are established, and the wireless connections C45, C46 and C56 among the bundled products 510*b* are established automatically in some embodiments.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system, comprising:
   a plurality of first electronic devices, each of the first electronic devices having a network identifier distinct from another; and
   a digital signature carrier, configured for recording a connective information list, the connective information list comprising the network identifiers of all of the first electronic devices;
   wherein a second electronic device comprising a digital signature reader is configured to read the digital signature carrier by the digital signature reader, and in response to extracting the connective information list comprising the network identifiers, the second electronic device automatically pairs with each of the first electronic devices which have not been connected to the second electronic device previously according to the network identifiers;
   wherein the connective information list further records a connective mapping between the first electronic devices and the connective mapping defines connective relationships of a mesh network between the first electronic devices; in response to the connective mapping being read by the second electronic device, the second electronic device is configured to send a connective command to at least two of the first electronic devices, wherein the at least two of the first electronic devices have not been previously paired to each other, the connective command is configured to trigger the at least two of the first electronic devices to be paired with each other and establish a wireless connection between the at least two of the first electronic devices.

2. The system of claim 1, further comprising:
   a digital signature producer, configured for gathering the network identifier from each of the first electronic devices and integrating the network identifiers of all of the first electronic devices into the digital signature carrier before the first electronic devices are packed as bundle products for sale.

3. The system of claim 2, wherein the digital signature carrier is a barcode label or a Quick Response (QR) code label, the digital signature producer is configured to print the barcode label or the QR code label, and the digital signature carrier is attached to the bundle products.

4. The system of claim 3, wherein the digital signature reader comprises an image-capturing unit, the image-capturing unit is configured to scan the barcode label or the Quick Response (QR) code label.

5. The system of claim 2, wherein the digital signature carrier is a Near Field Communication (NFC) tag or a Radio Frequency Identification (RFID) tag, the digital signature producer is configured to write the connective information list into the NFC tag or the RFID tag, and the digital signature carrier is attached to the bundle products.

6. The system of claim 5, wherein the digital signature reader comprises a NFC receiver or a RFID receiver, the NFC reader or the RFID reader is configured to read the NFC tag or the RFID tag wirelessly.

7. The system of claim 1, wherein the network identifiers are Media Access Control (MAC) addresses of the first electronic devices.

8. The system of claim 1, wherein the second electronic device is configured to send the connective command to the at least two of the first electronic devices according to the connective mapping.

9. The system of claim 1, wherein during one of the first electronic devices is searching for an available wireless access point, the second electronic device is configured to provide a Service Set Identifier (SSID) to the one of the first electronic devices, the Service Set Identifier corresponds to a wireless access point previously connected with the second electronic device.

10. The system of claim 1, wherein:
    the system comprises at least three of the first electronic devices, and the second electronic device sends the connective command to each of the first electric devices;
    for any one of the first electronic devices, the connective command comprises connective mapping for one or more of the remaining first electronic devices;
    for any one of the first electronic devices, in response to receiving the connective command from the second electronic device, in which the connective command comprises connective mapping for less than all of the remaining first electronic devices, said any one of the first electronic devices pairs with said less than all of the remaining first electronic devices; and
    for any one of the first electronic devices, in response to receiving the connective command from the second electronic device, in which the connective command comprises connective mapping for all of the remaining first electronic devices, said any one of the first electronic devices pairs with said all of the remaining first electronic devices.

11. A method, comprising:
    gathering network identifiers from all of a plurality of first electronic devices, each of the network identifiers being distinct from another;
    recording a connective mapping between the first electronic devices and the connective mapping defines connective relationships of a mesh network between the first electronic devices; and integrating the connective mapping and the network identifiers of all of the first electronic devices into a connective information list recorded in a digital signature carrier;

wherein in response to the digital signature carrier being read by a second electronic device, the second electronic device automatically pairing with each of the first electronic devices which have not been connected to the second electronic device previously according to the network identifiers, and the second electronic device is configured to send a connective command to at least two of the first electronic devices, wherein the at least two of the first electronic devices have not been previously paired to each other, the connective command is configured to trigger the at least two of the first electronic devices to be paired with each other and establish a wireless connection between the at least two of the first electronic devices.

12. The method of claim 11, wherein the digital signature carrier is integrated and attached to the first electronic devices before the first electronic devices are packed as bundle products for sale.

13. The method of claim 12, wherein the digital signature carrier is a barcode label or a Quick Response (QR) code label, the digital signature producer is configured to print the barcode label or the QR code label, and the digital signature carrier is attached to the bundle products.

14. The method of claim 12, wherein the digital signature carrier is a Near Field Communication (NFC) tag or a Radio Frequency Identification (RFID) tag, the digital signature producer is configured to write the connective information list into the NFC tag or the RFID tag, and the digital signature carrier is attached to the bundle products.

15. A method, comprising:
reading a digital signature carrier by a second electronic device, the digital signature carrier recording a connective information list associated with a plurality of first electronic devices, each of the first electronic devices having a network identifier distinct from another, the connective information list comprising the network identifiers of all of the first electronic devices; and automatically pairing the second electronic device with each of the first electronic devices which have not been connected to the second electronic device previously according to the network identifiers;

wherein the connective information list comprises a connective mapping between the first electronic devices and the connective mapping defines connective relationships of a mesh network between the first electronic devices; in response to the connective mapping being read by the second electronic device, the second electronic device is configured to send a connective command to at least two of the first electronic devices, wherein the at least two of the first electronic devices have not been previously paired to each other, the connective command triggers the at least two of the first electronic devices to be paired with each other and establish a wireless connection between the at least two of the first electronic devices.

16. The method of claim 15,
wherein the second electronic device sends the connective command to the at least two of the first electronic devices according to the connective mapping.

17. The method of claim 15, further comprising:
sending a plurality of first service set identifiers from one of the first electronic devices to the second electronic device after the one of the first electronic devices searches for an available wireless access point;

selecting a second service set identifier from the first service set identifiers by the second electronic device, the second Service Set Identifier corresponding to a wireless access point previously connected with the second electronic device;

providing the second service set identifier from the second electronic device to the one of the first electronic devices; and forming a wireless connection between the one of the first electronic devices and the wireless access point previously connected with the second electronic device according to the second service set identifier.

18. The method of claim 17, wherein a password or an authentication key to the wireless access point previously connected with the second electronic device is provided along with the second service set identifier from the second electronic device to the one of the first electronic devices.

19. The method of claim 15, wherein the digital signature carrier is a barcode label, a Quick Response (QR) code label, a Near Field Communication (NFC) tag or a Radio Frequency Identification (RFID).

* * * * *